(12) United States Patent
Zhu et al.

(10) Patent No.: US 8,928,303 B2
(45) Date of Patent: Jan. 6, 2015

(54) APPARATUS AND METHODS FOR TRANSIENT COMPENSATION OF SWITCHING POWER REGULATORS

(71) Applicant: Analog Devices Technology, Hamilton (BM)

(72) Inventors: Zhijie Zhu, Shanghai (CN); Junxiao Chen, Shanghai (CN); Bin Shao, Shanghai (CN)

(73) Assignee: Analog Devices Technology, Hamilton (BM)

( * ) Notice: Subject to any disclaimer, the term of this patent is extended or adjusted under 35 U.S.C. 154(b) by 113 days.

(21) Appl. No.: 13/827,666

(22) Filed: Mar. 14, 2013

(65) Prior Publication Data

US 2014/0266122 A1    Sep. 18, 2014

(51) Int. Cl.
*H02M 3/156* (2006.01)
(52) U.S. Cl.
CPC .................................... *H02M 3/156* (2013.01)
USPC ......................................................... 323/285
(58) Field of Classification Search
USPC .................................. 323/282, 284, 285, 351
See application file for complete search history.

(56) References Cited

U.S. PATENT DOCUMENTS

| 7,982,447 | B2 | 7/2011 | Chellamuthu et al. |
| 8,106,642 | B2* | 1/2012 | Chen et al. ................ 323/284 |
| 2008/0197826 | A1 | 8/2008 | Schiff et al. |
| 2011/0089918 | A1* | 4/2011 | Chang ......................... 323/282 |
| 2012/0146608 | A1* | 6/2012 | Wan et al. ................... 323/284 |

\* cited by examiner

*Primary Examiner* — Gary L Laxton
(74) *Attorney, Agent, or Firm* — Knobbe Martens Olson & Bear LLP

(57) ABSTRACT

Apparatus and methods for generating a drive signal of a switching signal are disclosed. A first circuit receives an oscillating reference signal, a first compensation signal, a second compensation signal, and a third compensation signal. The first compensation signal is indicative of an error between an output voltage of a power converter and a reference voltage. The second compensation signal is indicative of the error relative to a threshold. The third compensation signal is indicative of an output current of the power converter. The first circuit generates a comparison signal having a waveform including pulses having durations based at least partly on a combination of the periodic reference signal, the first compensation signal, the second compensation signal, and the third compensation signal. A second circuit receives a clock signal and the comparison signal and generates a drive signal for activation and deactivation of a driver transistor.

20 Claims, 9 Drawing Sheets

APPARATUS AND METHODS FOR TRANSIENT COMPENSATION OF SWITCHING POWER REGULATORS

BACKGROUND

1. Field

Embodiments of the invention relate to electronic devices, and more particularly, to switching regulators.

2. Description of the Related Technology

A switching regulator can be used to generate a regulated voltage by controlling a current provided to a load through an inductor. For example, the switching regulator can include one or more switches that are turned on and off. The duty cycle and/or timing of the switches can control the voltage level of the regulated voltage. Examples of switching regulators include, for example, buck converters and boost converters.

A switching regulator can be coupled with a feedback compensator to control the switching regulator for regulation. Feedback compensators can include one or more loops. For example, in current-mode control, the feedback compensator can include an inner current loop and an outer voltage loop. Measurements of the switching regulator's current and output voltages are fed back to the feedback compensator for generation of a pulse width modulation signal to control the switching regulator. Stability and robustness requirements, however, limit the bandwidth of the feedback compensator. As a result, the feedback compensator may result in unsatisfactory transient response to perturbation of load conditions. Thus, there is a need for improved feedback compensators circuits in switching regulators.

SUMMARY

In one embodiment, an apparatus to provide a power converter drive signal is disclosed. The apparatus comprises a first circuit configured to receive an oscillating reference signal, a first compensation signal, a second compensation signal, and a third compensation signal. The first circuit is configured to generate a comparison signal having a waveform comprising a plurality of pulses having pulse durations based at least partly on a combination of the periodic reference signal, the first compensation signal, the second compensation signal, and the third compensation signal. The first compensation signal is indicative of an error between an output voltage of a power converter and a reference voltage. The second compensation signal is indicative of the error relative to a threshold. The third compensation signal is indicative of an output current of the power converter. The apparatus further comprises a second circuit configured to receive a clock signal and the comparison signal. The second circuit is configured to generate a drive signal for activation and deactivation of a driver transistor. The second circuit is configured to generate the drive signal such that the drive signal activates the driver transistor based at least partly a characteristic of the clock signal. The second circuit is configured to generate the drive signal such that the drive signal deactivates the driver transistor based at least partly a characteristic of the comparison signal.

In another embodiment, a method for generating a drive signal is provided. The method comprises receiving an oscillating reference signal, a first compensation signal, a second compensation signal, and a third compensation signal. The first compensation signal is indicative of an error between an output voltage of a power converter and a reference voltage. The second compensation signal is indicative of the error relative to a threshold. The third compensation signal is indicative of an output current of the power converter. The method further comprises generating a comparison signal having a waveform comprising a plurality of pulses having pulse durations based at least partly on a combination of the periodic reference signal, the first compensation signal, the second compensation signal, and the third compensation signal. The method further comprises generating the drive signal for activation and deactivation of a driver transistor. The drive signal is generated such that the drive signal activates the driver transistor based at least partly a characteristic of the clock signal. The drive signal is generated such that the drive signal deactivates the driver transistor based at least partly a characteristic of the comparison signal.

In another embodiment, an apparatus includes means for receiving an oscillating reference signal, a first compensation signal, a second compensation signal, and a third compensation signal and for generating a comparison signal. The first compensation signal is indicative of an error between an output voltage of a power converter and a reference voltage. The second compensation signal is indicative of the error relative to a threshold. The third compensation signal is indicative of an output current of the power converter. The comparison signal has a waveform comprising a plurality of pulses having pulse durations based at least partly on a combination of the periodic reference signal, the first compensation signal, the second compensation signal, and the third compensation signal. The apparatus further comprising means for generating a drive signal for activation and deactivation of a driver transistor. The drive signal is generated such that the drive signal activates the driver transistor based at least partly a characteristic of the clock signal. The drive signal is generated such that the drive signal deactivates the driver transistor based at least partly a characteristic of the comparison signal.

BRIEF DESCRIPTION OF THE DRAWINGS

These drawings and the associated description herein are provided to illustrate specific embodiments of the invention and are not intended to be limiting.

DETAILED DESCRIPTION OF EMBODIMENTS

Figure 1:
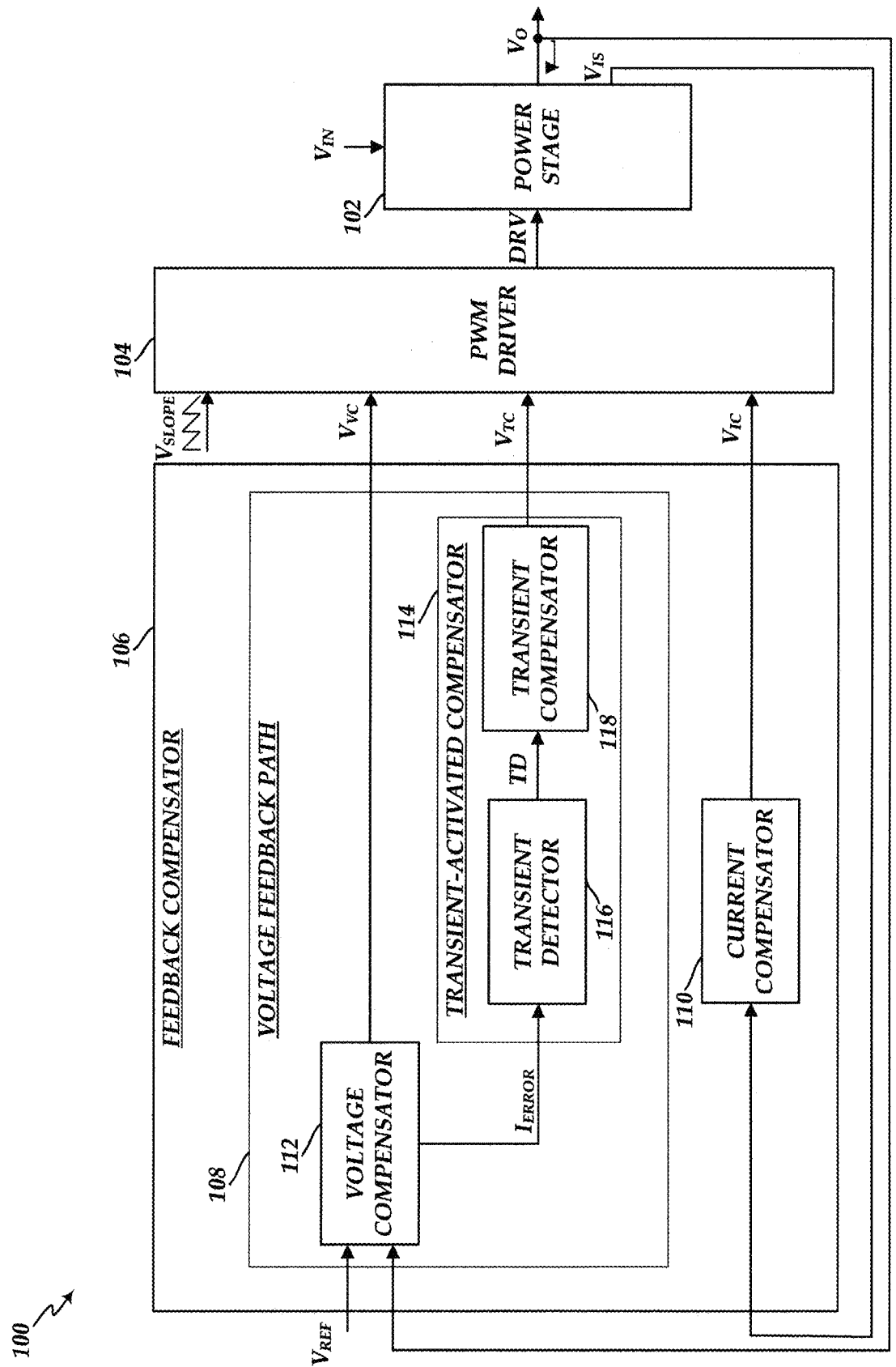
FIG. 1 is a schematic block diagram illustrating a closed-loop switching regulator.

The following detailed description of embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Embodiments are described in the context of systems and methods for feedback control of buck regulators, but will be applicable to other types of switching regulators, such as boost and buck-boost converters. In one embodiment, a driver circuit for controlling a switching regulator, such as a buck converter, can receive three or more compensation signals. Two of the three compensation signals are active during nominal operation and are provided to maintain the output voltage of the switching regulator at a desired level. For example, these two "nominal" compensation signals can be feedback control signals generated based on the sensed output current and output voltage error signal (for example, the difference between the desired output voltage and the measured output voltage). Because these feedback compensation signals are used during nominal operation, they should be designed to achieve specified minimum stability and robustness objectives. These objectives limit the achievable bandwidth of the closed-loop switching regulator. As a result, the switching regulator may suffer from poor transient response (for example, a slow response to a sudden load condition).

The third compensation signal is a transient compensation signal $V_{TC}$, which is also a feedback signal. This signal is inactive during nominal operation and does not affect the stability and robustness properties at a nominal operating point. For example, if the output voltage is within an expected range of the desired value, the transient compensation signal $V_{TC}$ is set to zero, as the first two compensation signals are performing adequately. However, if a transient condition is detected, the transient compensation signal $V_{TC}$ activates to supplement the nominal compensation signals in order to rapidly respond to or recover from a transient event.

Furthermore, a driver circuit can process the three compensation signals and can generate a comparison signal. The comparison signal has a series of pulses of variable widths, where the pulse widths control the on-off times of the switches of the switching regulator. For example, the driver circuit can make a comparison of a combination including the three compensation signals to determine the widths of the pulses for driving the output voltage to approximately the desired output voltage.

In a specific example, the feedback compensator includes nominal compensators (such as a voltage compensator and a current compensator) to generate the nominal compensation signals for the driver circuit. In addition, the feedback compensator can include a transient-activated compensator that monitors the error signal generated by a transconductance amplifier. The error signal is a measure of the difference between the reference voltage and the output voltage. In one embodiment, a transient event is determined to occur when the error signal exceeds a threshold. For example, the threshold can be predetermined as the nominal range of the error signals. If a transient event is detected, the transient-activated compensator generates an additional, supplemental compensation signal to improve transient response.

In another specific example, a threshold generator dynamically generates a threshold signal for comparing against the error signal for detection of transient events. The threshold generator can vary the threshold to accommodate varying operation conditions. For example, the output voltage can exhibit a ripple that depends on a number of factors. These factors may vary widely and can be challenging to predict. Accordingly, it may be difficult or infeasible to select a static threshold suitable for the range of possible operating conditions. Advantageously, the threshold generator monitors the ripple in the error signal and adjusts the threshold based on measurements of the error signal.

The disclosed methods, apparatus, and systems may function to improve existing switching regulators and the control of thereof. The transient compensation described can improve transient response while maintaining stability and robustness levels. As a result, a switching regulator can experience reduced overshoot and/or undershoot and improved response times. The transient compensation described below supplements existing compensation paths, such as the voltage and current compensation paths, without overriding those existing control paths. Smoother compensation can result.

FIG. 1 is a schematic block diagram illustrating a closed-loop switching regulator 100. The closed-loop switching regulator 100 includes a power stage 102, a pulse width modulation (PWM) driver 104, and a feedback compensator 106. The feedback compensator 106 includes a voltage feedback path 108 and a current compensator 110. The voltage feedback path 108 includes a voltage compensator 112 and a transient-activated compensator 114. The transient-activated compensator 114 includes a transient detector 116 and a transient compensator 118.

The power stage 102 receives a drive signal DRV as an input and generates an output voltage $V_O$ and a current sensed signal $V_{IS}$ as outputs. For example, the drive signal DRV can be a PWM signal having a variable duty cycle. The duty cycle determines, in part, a voltage level of the output voltage $V_O$. For example, the duty cycle determines how long current from a supply voltage $V_{IN}$ is provided to an inductor, the inductor configured to deliver power to the output of the power stage 102. The inductor stores energy in a magnetic field generated by the current flowing through the inductor. The current sensed signal $V_{IS}$ provides an indication of the output current $I_O$ (for example, a current running through the inductor). The current sensed signal $V_{IS}$ can be generated by an active current sensing circuit or by a passive sensing circuit.

In one embodiment, the power stage 102 is a power stage 102 of buck converter. The power stage 102, however, can be any applicable type of power stage, including a boost-type power stage. One embodiment of the power stage 102 will be described in further detail later in connection with FIG. 2.

The PWM driver 104 receives a slope compensation signal $V_{SLOPE}$, a voltage compensation signal $V_{VC}$, a transient compensation signal $V_{TC}$, and a current compensation signal $V_{IC}$ as inputs and generates the driver signal DRV as an output. For example, the PWM driver 104 provides the driver signal DRV to the power stage 102 for regulation of the output voltage $V_O$ to a reference voltage $V_{REF}$ by controlling the on-off times of the power stage 102. The PWM driver 104 generates the driver signal DRV based on the input compensation signals.

The voltage compensation signal $V_{VC}$ provides an indication of the output voltage error, which in the illustrated embodiment is the difference between the reference voltage $V_{REF}$ and the output voltage $V_O$ of the power stage 102. The transient compensation signal $V_{TC}$ provides an indication of the magnitude of the error signal $I_{ERROR}$ relative to a threshold. For example, when the magnitude of the error is less than the threshold, the transient compensation signal $V_{TC}$ can be nearly zero. Alternatively, when the magnitude of the error is larger than the threshold, the transient compensation signal $V_{TC}$ can be nonzero. In one embodiment, the transient compensation signal $V_{TC}$ is roughly proportional to the amount by which the magnitude of the error signal $I_{ERROR}$ exceeds the threshold. The current compensation signal $V_{IC}$ provides an indication of the amount of output current generated by the power stage 102. The slope compensation signal $V_{SLOPE}$, generated externally to the embodiment shown in FIG. 1, is used to damp sub-harmonic oscillations caused by PWM duty cycles greater than 50%. The PWM driver 104 generates the driver signal DRV based on a combination of these compensation signals. One embodiment of the PWM driver 104 will be described in further detail later in connection with FIG. 2.

The feedback compensator 106 receives the reference voltage $V_{REF}$ and the output voltage $V_O$ as inputs and generates the voltage compensation signal $V_{VC}$, the transient compensation signal $V_{TC}$, and the current compensation signal $V_{TC}$ as outputs. For example, the feedback compensator 106 can receive the output voltage $V_O$ from the power stage 102 and can provide the compensation signals to the PWM driver 104. The feedback compensator includes various compensators for generating the compensation signals.

The voltage feedback path 108 of the feedback compensator 106 receives the reference voltage $V_{REF}$ and the output voltage $V_O$ as inputs and provides the voltage compensation signal $V_{VC}$ and the transient compensation signal $I_{TC}$ as outputs. For example, the reference voltage $V_{REF}$ and the output voltage $V_O$ are carried along the voltage feedback path 108 to the voltage compensator 112 for generating the voltage compensation signal $V_{VC}$ and the transient compensation signal $V_{TC}$ (by way of the transient-activated compensator 114).

The voltage compensator 112 of the voltage feedback path 108 receives the reference voltage $V_{REF}$ and the output voltage $V_O$ as inputs and generates the voltage compensation signal $V_{VC}$ and an error signal $I_{ERROR}$ as outputs. For example, the voltage compensator 112 can generate the voltage compensation signal $V_{VC}$ based on an amplification of a comparison between the reference voltage $V_{REF}$ and the output voltage $V_O$. The error signal $I_{ERROR}$ can provide indication of the comparison. Various embodiments of the voltage compensator 112 will be described in greater detail later in connection with FIGS. 4A and 4B.

The transient-activated compensator 114 of the voltage feedback path 108 receives the error signal $I_{ERROR}$ as an input and generates the transient compensation signal $V_{TC}$ as an output. In the illustrated embodiment, the transient-activated compensator 114 receives the error signal $I_{ERROR}$ from the voltage compensator 112 along the voltage feedback path 108 and can generate the transient compensation signal $V_{TC}$ if the error signal $I_{ERROR}$ exceeds a threshold. Various embodiments of the transient-activated compensator will be described in further detail later in connection with FIGS. 4A and 4B.

The transient detector 116 of the transient-activated compensator 114 receives the error signal $I_{ERROR}$ as an input and generates a transient detection signal TD as an output. For example, the transient detector 116 can receive the error signal $I_{ERROR}$ from the voltage compensator 112 and compare the error signal $I_{ERROR}$ to a threshold. If the error signal $I_{ERROR}$ is greater than the threshold, indicating a presence of an output load transient event, then the transient detector 116 activates and generates the transient detection signal TD for indicating the occurrence of a transient event. The threshold can be fixed or varied dynamically. In one embodiment the threshold is varied dynamically based on the output voltage $V_O$ of the power stage 102. Various embodiments of the transient detector 116 will be described in greater detail later in connection with FIGS. 5-6B.

The transient compensator 118 of the transient-activated compensator 114 receives the transient detection signal TD as an input and generates the transient compensation signal $V_{TC}$ as an output. In the illustrated embodiment, the transient compensator 118 receives the transient detection signal TD from the transient detector 116 for generation of a transient compensation signal $V_{TC}$. During a transient event, the transient compensator 118 generates the transient compensation signal $V_{TC}$ to increase the closed-loop bandwidth of the closed-loop switching regulator 100. By increasing the bandwidth, the transient performance of the closed-loop switching regulator 100 should be improved over a switching regulator not incorporating the transient compensator. One embodiment of the transient compensator 118 will be described in greater detail later in connection with FIGS. 4A and 4B.

The current compensator 110 of the feedback compensator 106 receives the current sensed signal $V_{IS}$ as an input and generates the current compensation signal $V_{IC}$ as an output. In the illustrated embodiment, the current compensator 110 of FIG. 1 receives the current sensed signal $V_{IS}$ from the power stage 102 provides the current compensation signal $V_{IC}$ to the PWM driver 104. In operation, the current compensator 110 can generate the current compensation signal $V_{IC}$ to limit the output current of the power stage 102. For example, the current compensator 110 can be implemented in various applicable control modes, such as peak current mode control, valley current mode control, emulated current mode control, and hysteric current mode control.

The slope compensation signal $V_{SLOPE}$ can be generated by a signal generator (not shown). For example, any applicable signal generator or circuit capable of generating an oscillating signal, such as, but not limited to, sinusoidal, sawtooth, or triangular waveforms, can be used. The slope compensation signal $V_{SLOPE}$ can be used for inhibiting sub-harmonic oscillations at duty cycles higher than 50%. In some embodiments, slope compensation can be used to attenuate or inhibit these sub-harmonic oscillations, for example, by using a ramp waveform having a slope greater than one-half of the inductor current down slope. Slope compensation can slow down transient response. One advantage, among others, of various embodiments described herein is to regain some of the performance lost due to slope compensation.

Figure 2:
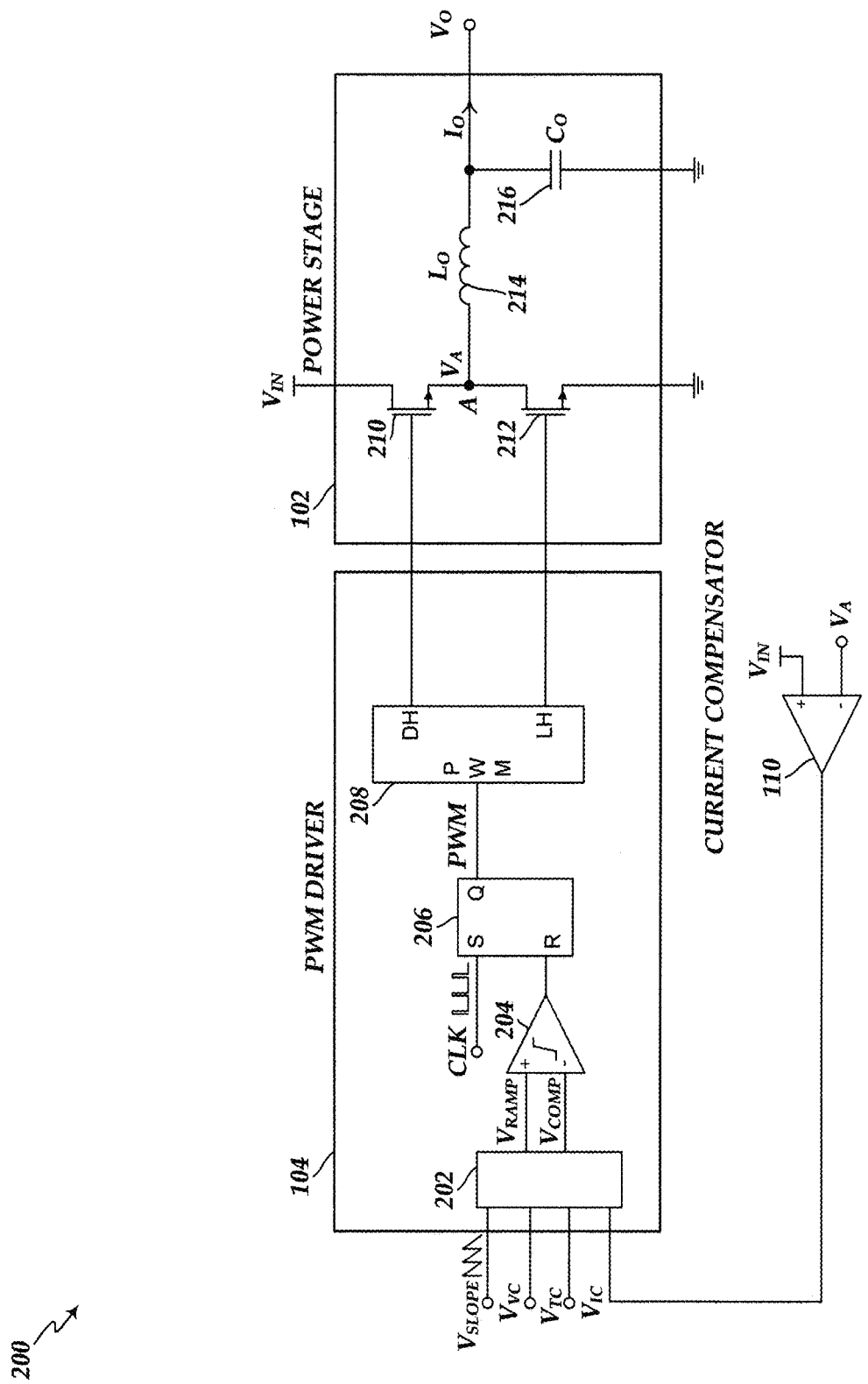
FIG. 2 is a schematic circuit diagram illustrating one embodiment of a driver-power circuit with the current compensator of FIG. 1.

FIG. 2 illustrates a schematic circuit diagram of one embodiment of a driver-power circuit 200 with the current compensator 110 of FIG. 1. The driver-power circuit 200 includes the PWM driver 104 and the power stage 102. The PWM driver 104 includes a driver interface circuit 202, a PWM comparator 204, a latch, and a timing circuit 208. The power stage 102 includes a high-side transistor 210, a low-side transistor 212, an output inductor 214, and an output capacitor 216. In an alternative embodiment, the low-side transistor 212 can be replaced with a diode.

The driver interface circuit 202 of the PWM driver 104 receives the slope compensation signal $V_{SLOPE}$, the voltage compensation signal $V_{VC}$, the transient compensation signal $V_{TC}$, and the current compensation signal $V_{IC}$ as inputs and generates a ramp signal $V_{RAMP}$ and a "comp" signal $V_{COMP}$ as outputs. The driver interface circuit 202 combines the compensation signals $V_{SLOPE}$, $V_{VC}$, $V_{TC}$, $V_{IC}$ between the two outputs in a way that is suitable for the PWM driver 104 to generate the driver signal DRV. For example, the driver interface circuit 202 can assign any number of the compensation signals $V_{SLOPE}$, $V_{VC}$, $V_{TC}$, $V_{IC}$ to form the ramp signal $V_{RAMP}$, and the remaining compensation signals are assigned to form the comp signal $V_{COMP}$. In some embodiments, the compensation signals switch signs, that is, are inverted, as they switch between the ramp signal $V_{RAMP}$ and the comp signal $V_{COMP}$. The compensation signals are grouped such the comparison $V_{RAMP} > V_{COMP}$ is functionally approximate to the comparison of the compensation signals with the slope compensation signal: ($V_{IC}-V_{TC}-V_{VC}>V_{SLOPE}$).

Figure 3A:
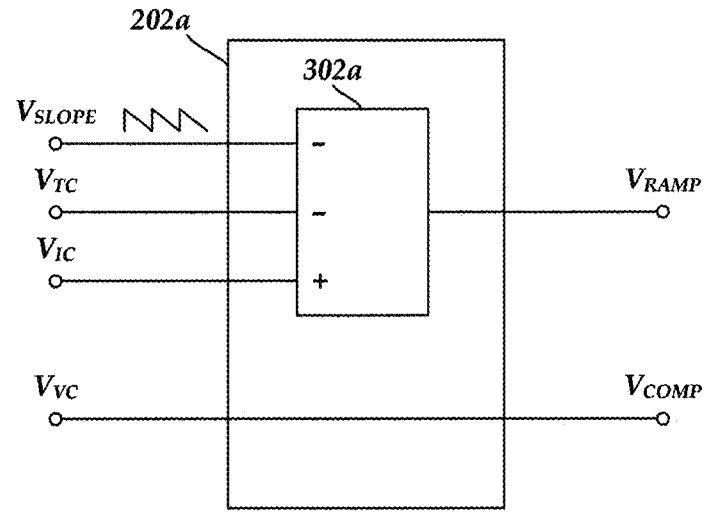
FIGS. 3A and 3B are schematic block diagrams illustrating various embodiments of the driver interface circuit of FIG. 2.
Figure 3B:
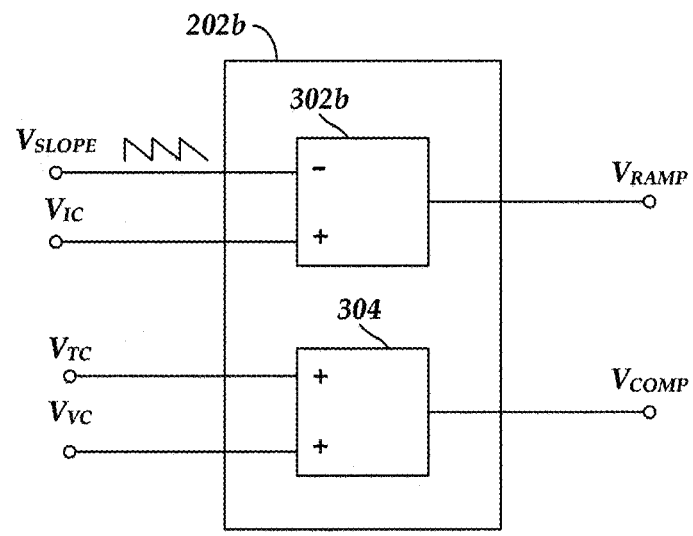

FIGS. 3A and 3B are schematic block diagrams illustrating various embodiments that can be used for the driver interface circuit 202 of FIG. 2. A driver interface circuit 202a of FIG. 3A shows a first summing block 302a that receives the slope compensation signal $V_{SLOPE}$, the transient compensation signal $V_{TC}$, and the current compensation signal $V_{IC}$ as inputs and generates the ramp signal $V_{RAMP}$ as an output. The first summing block 302a subtracts the slope compensation signal $V_{SLOPE}$ and the transient compensation signal $V_{TC}$ from the current compensation signal $V_{IC}$. The voltage compensation signal $V_{VC}$ is passed through to the comp signal $V_{COMP}$. A driver interface circuit 202b of FIG. 3B includes a first summing block 302b and a second summing block 304. The first summing block 302b receives the slope compensation signal $V_{SLOPE}$ and the current compensation signal $V_{IC}$ as inputs and generates the ramp signal $V_{RAMP}$ as an output. The ramp signal $V_{RAMP}$ is generated by comparing the current compensation signal $V_{IC}$ and the slope compensation signal $V_{SLOPE}$. The second summing block 304 receives the transient compensation signal $V_{TC}$ and the voltage compensation signal $V_{VC}$ as inputs and generates the comp signal $V_{COMP}$ by summing the two signals.

Figures 4A, 4B:
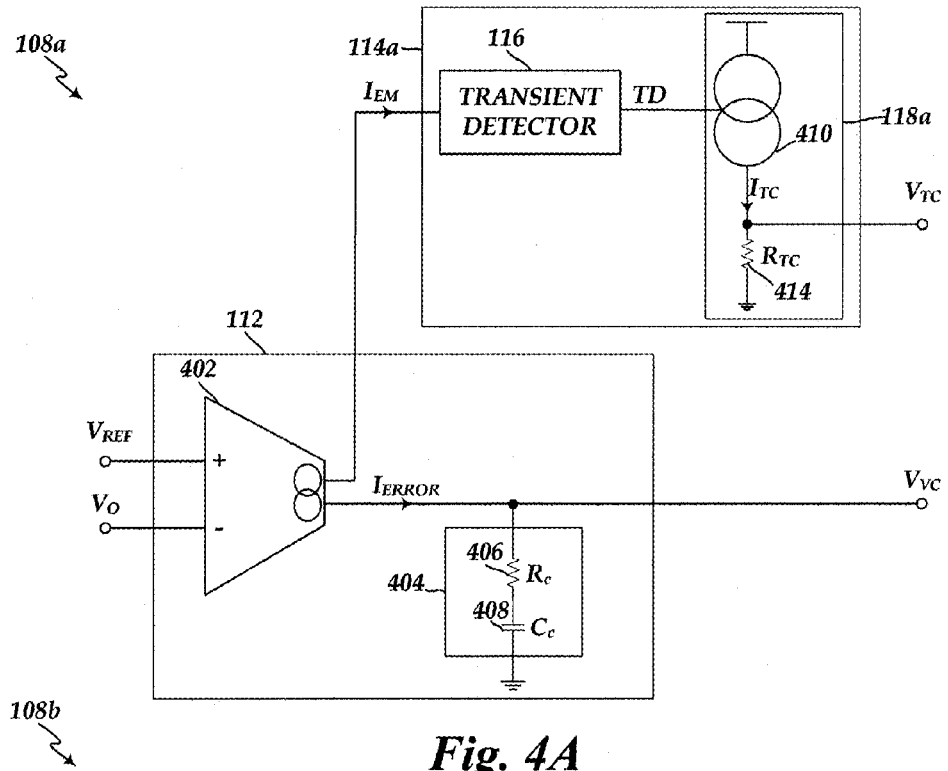
FIGS. 4A and 4B are schematic diagrams illustrating various embodiments of the voltage feedback path of FIG. 1.

The selection of the compensation signals between the ramp signal $V_{RAMP}$ and the comp signal $V_{COMP}$ can result in certain implementation advantages. For example, it may not be possible to add additional signals to modify the comp signal $V_{COMP}$ without having to redesign a compensation network attached to the comp input of, for example, the PWM comparator 204 of FIG. 2 because of the specifics of the circuit design. In this case, the embodiment shown in FIG. 3A may have advantages. In other embodiments, adding the transient compensation signal $V_{TC}$ and the voltage compensation signal $V_{VC}$ to form the comp signal $V_{COMP}$ reduces the number circuit components needed to implement the driver interface circuit 202. For instance, the circuit discussed below in connection with FIG. 4B is one example. Furthermore, in some implementations, the ramp signal $V_{RAMP}$ may not be accessible, and being able to add the transient compensation signal $V_{TC}$ to the comp signal $V_{COMP}$ may be desirable or necessary.

Returning now to FIG. 2, the PWM comparator 204 of the PWM driver 104 receives the ramp signal $V_{RAMP}$ and the comp signal $V_{COMP}$ as inputs and generates a comparison signal as an output. For example, the PWM comparator 204 receives and compares the ramp signal $V_{RAMP}$ and the comp signal $V_{COMP}$ from the driver interface circuit 202. If the ramp signal $V_{RAMP}$ is higher than the comp signal $V_{COMP}$, then the comparison signal is high. When the ramp signal $V_{RAMP}$ is lower than the comp signal $V_{COMP}$, then the comparison signal is low. The PWM comparator 204 can correspond to any applicable analog or digital circuitry, including, but not limited to, a comparator or an operational amplifier.

The latch 206 of the PWM driver 104 receives a clock signal CLK and the comparison signal as inputs and generates a PWM signal as an output. For example, the frequency of the clock signal CLK can determine the cycle period of the PWM signal by comparing the clock signal CLK and the comparison signal. At the start of the PWM period, the clock signal CLK sets the PWM signal to high. When the comp signal $V_{COMP}$ becomes lower than the ramp signal $V_{RAMP}$, then the latch 206 is reset, and the PWM signal is set to low. At the start of the new cycle, the clock signal CLK once again sets the latch 206 so that the PWM signal set high. In this way, the PWM signal can transition at most, twice per PWM cycle. In some embodiments, the latch 206 can inhibit rapid switching that would otherwise occur due to rapid switching of the comparison signal output of the PWM comparator 204. The latch 206 can be a synchronous or an asynchronous set-reset (SR) latch. Other applicable latches will be readily determined by one of ordinary skill in the art.

The timing circuit 208 of the PWM driver 104 receives the PWM signal as input and generates a high-side switching signal and a low-side switching signal as outputs. For example, the timing circuit 208 receives the PWM signal from the latch 206 and generates the high-side switching signal and the low-side switching signal such that both switching signals should not be on at the same time. Having both switching signals on at the same time can damage certain power stages. The timing circuit 208 can be implemented with latches or flip-flops include circuits to prevent both switches from activating at the same time. Other applicable circuits will be readily determined by one of ordinary skill in the art.

The high-side transistor 210 and the low-side transistor 212 receive the high-side switching signal and the low-side switching signal, respectively, and activate or deactivate in accordance with the corresponding switching signal. When the high-side transistor 210 is activated, a supply voltage $V_{IN}$ provides current to an output node having the output voltage $V_O$. The current stores energy in a magnetic field of the output inductor 214. When the low-side transistor 212 is activated and the high-side transistor 210 is deactivated, the stored energy in the magnetic field of the output inductor 214 maintains current flow to the load while the output capacitor 216 prevents an instantaneous change in the output voltage $V_O$. Applicable inductances of the output inductor 214 and capacitances of the output capacitor 216 will be readily determined by one of ordinary skill in the art.

The output capacitor 216 can be sized to reduce overshoot and undershoot during load transients. For example, a large capacitance will slow the discharge or the accumulation of charge at the output of the switching regulator. However, relatively large capacitance may be needed for satisfactory results. Circuit size and costs can increase with capacitance. One advantage, among others, of various embodiments is that transient compensation can reduce the size of the output capacitor 216 needed for satisfactory overshoot and undershoot.

FIG. 2 also shows one embodiment of a current compensator 110. The current compensator 110 receives the supply voltage $V_{IN}$ and the voltage $V_A$ at node A and generates the current compensation signal $V_{IC}$. For example, when the high-side transistor 210 is on and neglecting current used in charging the output capacitor 216, the output current $I_O$ of the power stage 102 is the same current that runs through the high-side transistor 210. Additionally, when the high-side transistor 210 is on, the high-side transistor 210 has a resistance $R_{ON}$ from drain to source. The output current $I_O$ can then be approximated by using from Ohm's law as applied across the high-side transistor 210. For example, the output current $I_O$ can be computed from the following equation:

$$I_O \approx \frac{V_{IN} - V_A}{R_{ON}} \qquad \text{Eq. 1}$$

In one embodiment, the current compensator 110 generates the current compensation signal $V_{IC}$ as an output, which is proportional to the right-hand side of the Equation 1. The current compensator 110 can correspond to a difference or differential amplifier. Other applicable types of comparators and amplifiers will be readily determined by one of ordinary skill in the art.

FIG. 4A illustrates a schematic diagram of one embodiment of a voltage feedback path 108a that can be used for the voltage feedback path 108 of FIG. 1. The voltage feedback path 108a includes the voltage compensator 112 and the transient-activated compensator 114a of FIG. 1. The voltage compensator 112 of FIG. 4A includes a transconductance error amplifier 402 and a compensation network 404, such as a compensation resistor 406 and a compensation capacitor 408. The transient-activated compensator 114a includes the transient detector 116 and the transient compensator 118a. In turn, the transient compensator 118a includes a controlled current source 410 and a transient resistor 414.

The error amplifier 402 of the voltage compensator 112 receives the reference voltage $V_{REF}$ and the output voltage $V_O$ as inputs and generates an error signal $I_{ERROR}$ as an output. The error signal $I_{ERROR}$ can be based on an amplification of a difference between the reference voltage $V_{REF}$ and the output voltage $V_O$. In the illustrated embodiment, the error amplifier 402 is a transconductance amplifier and generates the error signal as a current signal. The error amplifier 402 of FIG. 4A also generates one or more copies of the error signal $I_{ERROR}$, represented collectively by the error signal $I_{EM}$ in FIG. 4A. The error amplifier's 402 transconductance $g_m$ for each of the error signals $I_{ERROR}$, $I_{EM}$ can be the same or different. In some implementations, the error amplifier 402 can be implemented by a single-ended (for example, having one output line) transconductance amplifier coupled with one or more current mirrors to generate the copy error signal $I_{EM}$; by two or more separate transconductance amplifiers; and/or an integrated transconductance amplifier circuit that generates the error signals $I_{ERROR}$, $I_{EM}$. Other embodiments of the voltage feedback path 108a include an error amplifier 402 that generates the error signals $I_{ERROR}$, $I_{EM}$ as voltage signals.

Generating the error signals $I_{ERROR}$, $I_{EM}$ using a transconductance amplifier can have various benefits over using a voltage amplifier. One benefit, among others, is that in some embodiments the transconductance error amplifier 402 generates error signals $I_{ERROR}$, $I_{EM}$ that have virtually no current offset, whereas a voltage-mode error amplifier (that is, an error amplifier of a voltage-mode regulator that generates a voltage as an output) can have an offset at its output. If there is an offset, then error amplifier 402 should be trimmed. As a result, in some embodiments the transconductance error amplifier 402 can avoid steps and circuits to trim the amplifier 402 during operation.

The compensation network 404 of the voltage compensator 112 receives the error signal $I_{ERROR}$ as an input and generates the voltage compensation signal $V_{VC}$ as an output. The compensation network 404 of FIG. 4A converts the error signal $I_{ERROR}$ from a current signal to a voltage signal. It does this by passing the error signal $I_{ERROR}$ current through the compensation resistor 406 and the compensation capacitance 408 for generating the compensation signal $V_{VC}$. The values of the resistance of the compensation resistor 406 and the capacitance of the compensation capacitance 408 can be selected, for example, based on stability considerations. The compensation resistor 406 can have a resistance selected from about 1 kilohm to about 1 megohm, and the compensation capacitor 408 can have a capacitance from about 1 picofarad to about 1 nanofarad. Other applicable resistances and capacitances will be readily determined by one of ordinary skill in the art.

The transient detector 116 of the transient-activated compensator 114a receives the error signal(s) $I_{EM}$ as an input and generates the transient detection signal TD as an output. In the illustrated embodiment, the transient detector 116 monitors the error signal $I_{EM}$ provided by the error amplifier 402 and generates the transient detection signal TD for indicating whether the error signal $I_{EM}$ has exceeded a threshold. For example, the transient detector 116 can generate the transient detection signal TD with a magnitude that is substantially greater than zero when the error signal $I_{EM}$ is greater than the threshold. Additionally, the transient detector 116 can generate the transient detection signal TD with a magnitude that is approximately zero when the error signal $I_{EM}$ is less than the threshold. In this way, the transient detector 116 provides an indication of the occurrence of a transient event based on the magnitude of the transient detection signal TD. In some embodiments, the transient detector 116 can generate the transient detection signal TD with a magnitude that increases as the error signal $I_{EM}$ increases greater than the threshold. An input-output characteristic of one embodiment of the transient detector 116 will be described in further detail later in connection with FIG. 5.

The controlled current source 410 of the transient compensator 118a receives the transient detection signal TD from the transient detector 116 and generates a transient current signal $I_{TC}$ as an output. In one embodiment, the transient compensator 118a generates the transient current signal $I_{TC}$ in proportion to the magnitude of the transient detection signal TD (for example, $I_{TC}=cTD$ for some non-zero gain c). Applicable gains will be readily determined by one of ordinary skill in the art based on a variety of considerations, including but not limited to response time, stability, saturation, device/component limitations, and other like considerations. The controlled current source 410 shown in FIG. 4A can correspond to a current controlled current source or a current mirror (for example, if the transient detection signal TD is a current source $I_{TD}$) for generating the transient current signal $I_{TC}$ based on the transient detection signal TD. In another embodiment, the controlled current source 410 can be a voltage controlled current source or a controlled voltage source.

In one embodiment, the transient detector 116 and the controlled-current source 410 form an integrated controlled-current source for detecting a transient event and generating the transient current $I_{TC}$.

The transient resistor 414 receives the transient current signal $I_{TC}$ as an input and generates the transient compensation signal $V_{TC}$ as an output. For example, in the illustrated embodiment, the transient compensation signal $V_{TC}$ is generated by passing the transient current signal $I_{TC}$ through the transient resistor 414 to generate the transient compensation signal $V_{TC}$. The transient resistor 414 can have a resistance selected from about half to about five times the compensation resistance 406. Other applicable resistances will be readily determined by one of ordinary skill in the art.

In one embodiment, the transient-activated compensator 114a can have a bandwidth that is greater than the bandwidth of voltage compensator 112. For example, the bandwidth of the voltage compensator 112 of FIG. 4A may be limited by stability objectives for nominal (e.g., non-transient) conditions. The transient-activated compensator 114a is inactive when a transient event has not been detected (for example, during nominal operation). In this way, the transient-activated compensator 114a does not substantially affect nominal stability objectives. As such, the bandwidth of the transient-activated compensator 114a can be designed to exceed the bandwidth of the voltage compensator 112.

In one embodiment, the transient-activated compensator 114a can generate the transient compensation signal $V_{TC}$ independent of the voltage compensation signal $V_{VC}$. For example, while both the transient compensation signal $V_{TC}$ and the voltage compensation signal $V_{VC}$ are based on the error signal $I_{ERROR}$, the transient compensation signal $V_{TC}$ does not vary with the voltage compensation signal $V_{VC}$. Accordingly, the transient-activated compensator 114a and the voltage compensator 112 can have modular designs. For example, changes in the design of voltage compensator 112 (for example, changes in gain, bandwidth, and like) should not affect the design of the transient-activated compensator 114a. Furthermore, if the voltage compensator 112 malfunctions, the transient-activated compensator 114a may still be able to provide acceptable closed-loop performance.

The transient-activated compensator 114a can improve transient response while maintaining nominal stability properties. For example, as stated earlier, the transient-activated compensator 114a can have a bandwidth that is greater than the bandwidth of the voltage compensator 112. Furthermore, during nominal operating conditions, the transient-activated compensator 114a should be inactive, and the bandwidth of the voltage feedback path 108a should be the bandwidth of the voltage compensator 112. Thus, the voltage feedback path 108 during nominal conditions should result in stable feedback. During transient conditions, when higher response times are preferred, the high-bandwidth portion of the voltage feedback path 108 (for example, the transient-activated compensator 114a) should temporarily activate to increase the speed of response of the closed-loop switching regulator 100. After the closed-loop switching regulator 100 has responded to the transient event (for example, after the error signal $I_{EM}$ has become less than the threshold), the transient-activated compensator 114a of the voltage feedback path 108 should deactivate and nominal stability properties should return.

FIG. 4B is schematic diagram illustrating another embodiment of the voltage feedback path 108b of FIG. 1. Elements common to both voltage feedback paths 108a, 108b share common reference indicia, and only differences between the voltage feedback paths 108a, 108b are described herein for the sake of brevity.

The transient-activated compensator 114b includes the transient detector 116 and the transient compensator 118b, which is formed by the controlled current source 410 and the compensation network 404. As in FIG. 4A, the compensation network 404 also forms a portion of the voltage compensator 112. In the illustrated embodiment, the controlled current source 410 passes the transient compensation current $I_{TC}$ through the compensation network 404 to generate the transient compensation signal $V_{TC}$.

In the illustrated embodiment, the error amplifier 402 and the controlled current source 410 both pass their current outputs $I_{ERROR}$, $I_{TC}$ through the compensation network 404 to generate a superposition $V_{VC}+V_{TC}$ of the separate compensation signals $V_{VC}$, $V_{TC}$. In this way, the voltage compensator 112 and the transient-activated compensator 114b have a partially integrated configuration. Since the voltage compensator 112 and the transient-activated compensator 114b both use the compensation network 404 to generate their respective compensation signals $V_{VC}$, $V_{TC}$, the transient resistor 414 of FIG. 4A can be omitted. The embodiment shown in FIG. 4B can reduce circuit size and cost.

In some embodiments of the voltage feedback path 108b, the controlled current source 410 generates the transient current signal $I_{TC}$ in proportion to the error signal $I_{ERROR}$ or in proportion to the amount in which the error signal $I_{ERROR}$ exceeds the threshold. For example, the transient current signal $I_{TC}$ can be selected to be about 1.6 times the error signal $I_{ERROR}$ when activated. In another embodiments, the transient current signal $I_{TC}$ can be selected to have a magnitude that chosen to be about 0.1 to about 10 times the magnitude of the error signal $I_{ERROR}$ when activated. In another embodiments, the transient current signal $I_{TC}$ can be selected to have a magnitude that be about 0.25 to about 100 times the error signal $I_{ERROR}$ when activated. It will be appreciated that other applicable multiplication factors can be readily determined by those with skill in the art.

Figure 5:
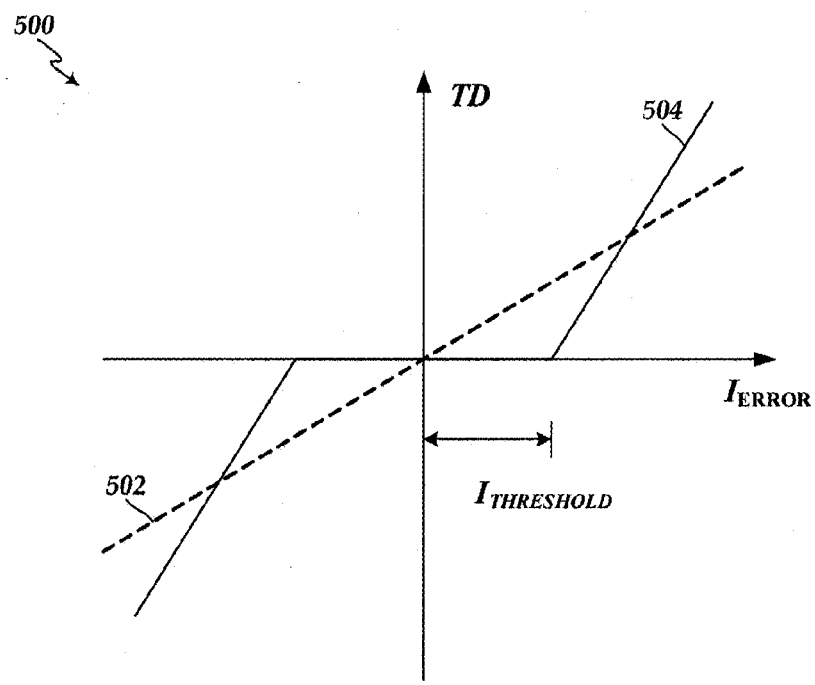
FIG. 5 is a plot illustrating examples of input-output characteristics of the transient detector of FIGS. 1, 4A, and 4B.

FIG. 5 is a plot 500 illustrating examples of input-output characteristics of the transient detector 116 of FIGS. 1, 4A, and 4B. The error signal (input) is expressed along a horizontal axis. The transient detection signal TD (output) is expressed along a vertical axis. The plot 500 includes a first curve 502 that indicates a model input-output characteristic of the transient detector 116. For example, the transient detection signal TD of the first curve 502 takes on values that are proportional to the error signal $I_{EM}$. However, due to stability concerns, a linear input output characteristic may not be practical. The plot 500 includes a second curve 504 of a continuous, nonlinear model of the input-output characteristic of the transient detector 116. In particular, the transient detection signal TD of the second curve 504 has a value of about zero when the error signal $I_{EM}$ is less than a threshold $I_{THRESHOLD}$. When the error signal $I_{EM}$ is greater than the threshold $I_{THRESHOLD}$, the transient detection signal TD increases as the error signal $I_{EM}$ increases. For example, the transient detection signal TD can increase linearly as the error signal $I_{EM}$ exceeds the threshold $I_{THRESHOLD}$. Other applicable input-output relationships will be readily determined by one of ordinary skill in the art based on a variety of considerations, including, but not limited, to response time, stability, saturation, and other like considerations.

In one embodiment, the threshold $I_{THRESHOLD}$ can correspond to a fixed or predetermined value. In another embodiment, the threshold $I_{THRESHOLD}$ can be variably set. For instance, the threshold $I_{THRESHOLD}$ can be generated dynamically, for example, based on the output voltage $V_O$ of the power stage of FIG. 1. The generation of the threshold will be described in greater detail later in connection with FIGS. 9 and 10.

Figure 6A:
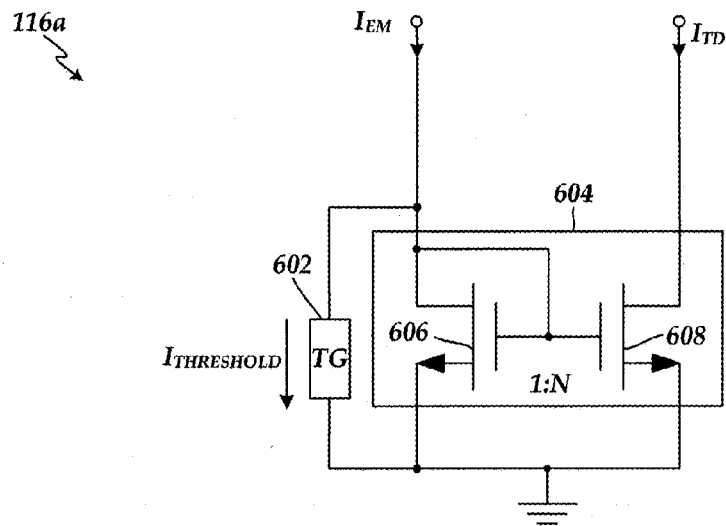
FIGS. 6A and 6B are schematic circuit diagrams in the transient-activated compensator of FIGS. 1, 4A, and 4B in accordance with various embodiments.

FIG. 6A is a schematic circuit diagram of a transient detector 116a that can be used for the transient detector 116 of FIGS. 1, 4A, and 4B in accordance with one embodiment. The transient detector 116a includes a threshold generator 602 and a current mirror 604. The current mirror 604 includes a first transistor 606 and a second transistor 608. The transient detector 116a receives the error signal $I_{EM}$, and a portion of the error signal $I_{EM}$ flows to the threshold generator 602 and another portion flows to the first transistor 606 (diode-connected) of the current mirror 604. For example, the threshold generator 602 pulls a portion (up to a threshold current signal $I_{THRESHOLD}$) of the error signal $I_{EM}$ away from the first transistor 606 of the current mirror 604. Accordingly, the current mirror 604 receives the portion of the error signal $I_{EM}$ that exceeds the threshold current signal $I_{THRESHOLD}$. In some embodiments, the threshold generator 602 is a constant current source. In another embodiment, the threshold generator 602 is a controlled current source, such as a voltage controlled current source or a current controlled current source. In another embodiment, the threshold generator 602 is circuit that dynamically adjusts the threshold current signal $I_{THRESHOLD}$, for example, as described in connection with FIGS. 9 and 10.

The current mirror 604 receives a portion of the error signal $I_{EM}$ as an input and generates the transient detection signal $I_{TD}$ (a current signal representing the detection signal TD) in proportion to the portion of the error signal $I_{ERROR}$ received by the first transistor 606. The first transistor 606 can receive the portion of the error signal $I_{EM}$ and carries the received portion from the drain to the source of the first transistor 606. Being connected as a current mirror, the gate and drain voltages of the first transistor 606 are provided to the second transistor 608 such that the second transistor 608 generates the transient current signal $I_{TC}$ in proportion to the portion of the error signal $I_{ERROR}$ received by the first transistor 606. The ratio 1:N of the channel widths of the first transistor 606 and the second transistor 608 can be selected from about 1:2 to about 1:5.

Figure 6B:
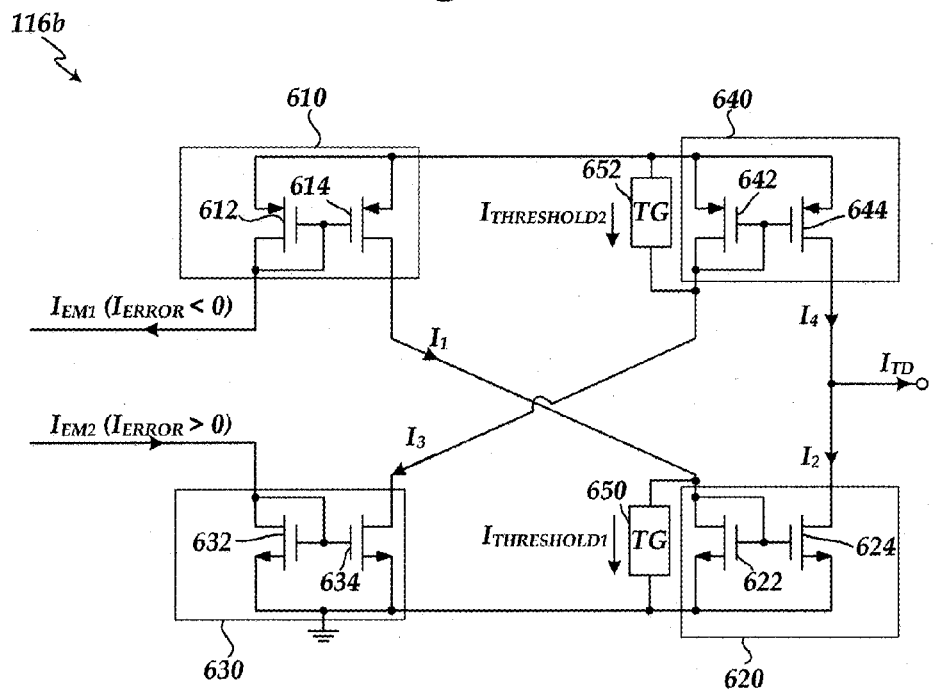

FIG. 6B is a schematic circuit diagram of the transient detector 116b of FIGS. 1, 4A, and 4B. The transient detector 116b of FIG. 6B includes a first current mirror 610, a second current mirror 620, a third current mirror 630, a fourth current mirror 640, a first threshold generator 650, and a second threshold generator 652. The first current mirror 610 includes a first transistor 612 and a second transistor 614. The second current mirror 620 includes first transistor 622 and second transistor 624. The third current mirror 630 includes a first transistor 632 and a second transistor 634. The fourth current mirror 640 includes first transistor 642 and second transistor 644.

The transient detector 116b receives a first error signal $I_{EM1}$ and a second error signal $I_{EM2}$ as inputs and generates the transient detection signal $I_{TD}$ as an output. As described previously in connection with FIG. 4A, the error amplifier 402 of the voltage compensator 112 can generate one or more copies of the error signal $I_{ERROR}$, collectively represented by the error signal $I_{EM}$ in FIG. 4A. Accordingly, in FIG. 6A the first error signal $I_{EM1}$ and the second error signal $I_{EM2}$ represent two copies of the two or more copies of the error signal $I_{ERROR}$. In the illustrated embodiment, the first error signal $I_{EM1}$ has a negative polarity or direction, and the second error signal $I_{EM2}$ has a positive polarity or direction. For example, the first error signal $I_{EM1}$ flows out of the transient detector 116b when the error signal $I_{ERROR}$ of FIG. 4A has a negative polarity or direction, and otherwise has no current. Additionally, the second error signal $I_{EM2}$ flows into the transient detector 116b when the error signal $I_{ERROR}$ of FIG. 4A has a positive polarity, and otherwise has no current.

In operation, when the first error signal $I_{EM1}$ is provided and has a current, the first transistor 612 (diode-connected) of the first current mirror 610 receives the first error signal $I_{EM1}$, and the second transistor 614 of the first current mirror 610 generates a current $I_1$ that represents a copy of the first error signal $I_{EM1}$. In the illustrated embodiment, the current $I_1$ is provided to the first threshold generator 650 and the second current mirror 620.

The first threshold generator 650 receives a portion of the current $I_1$ as an input and carries a threshold $I_{THRESHOLD1}$ from the input to an output. In doing so, the first threshold generator 650 diverts the portion (up to the amount of the threshold $I_{THRESHOLD1}$) of the current $I_1$ through the first threshold generator 650 and away from the second current mirror 620. In effect, the first threshold generator 650 inhibits the second current mirror 620 from receiving the current $I_1$ until the current $I_1$ is greater than the threshold $I_{THRESHOLD1}$.

The first transistor 622 (diode-connected) of the second current mirror 620 receives the remaining portion of the current $I_1$ (for example, the difference between the current $I_1$ and the first threshold $I_{THRESHOLD1}$), and the second transistor 624 of the second current mirror 620 generates a current $I_2$ that represents a copy of the remaining portion of the current $I_1$. The current $I_2$ forms, in part, the transient detection signal $I_{TD}$. For example, if the first transistor 612 and the second transistor 614 of the first current mirror 610 have a channel width ratio of 1:N, and if the first transistor 622 and the second transistor 624 of the second current mirror 620 have a channel width ratio of 1:1, then the transient detection signal $I_{TD}$ can be approximated by the following equation when the error signal $I_{ERROR}$ is negative:

$$I_{TD} \approx N \cdot I_{EM1} - I_{THRESHOLD\,1} \qquad \text{Eq. 2}$$
$$\approx N \cdot I_{ERROR} - I_{THRESHOLD\,1}$$

When the second error signal $I_{EM2}$ is provided and has a current, first transistor 632 (diode-connected) of the third current mirror 630 receives the second error signal $I_{EM2}$, the and the second transistor 634 of the third current mirror 630 generates a current $I_3$ that represents a copy of the second error signal $I_{EM2}$. In the illustrated embodiment, the current $I_3$ is provided to the second threshold generator 652 and the fourth current mirror 640.

The second threshold generator 652 receives a portion of the current $I_3$ as an input and carries a threshold $I_{THRESHOLD2}$ from the input to an output. In doing so, the second threshold generator 652 diverts the portion (up to the amount of the threshold $I_{THRESHOLD2}$) of the current $I_3$ through the second threshold generator 652 and away from the fourth current mirror 640. In effect, the second threshold generator 652 inhibits the fourth current mirror 640 from receiving the current $I_3$ until the current $I_3$ is greater than the threshold $I_{THRESHOLD2}$.

The first transistor 642 (diode-connected) of the fourth current mirror 640 receives the remaining portion of the current $I_3$ (for example, the difference between the current $I_3$ and the second threshold $I_{THRESHOLD2}$), and the second transistor 644 of the fourth current mirror 640 generates a current $I_4$ which represents the remaining portion of the current $I_3$. The current $I_4$ forms, in part, the transient detection signal $I_{TD}$. For example, if the first transistor 632 and the second transistor 634 of the third current mirror 630 have a channel width ratio of 1:N, and if the first transistor 642 and the second transistor 644 of the fourth current mirror 640 have a channel width ratio of 1:1, then the transient detection signal $I_{TD}$ can be approximated by the following equation when the error signal $I_{ERROR}$ is positive:

$$I_{TD} \approx N \cdot I_{EM2} - I_{THRESHOLD\,2} \qquad \text{Eq. 3}$$
$$\approx N \cdot I_{ERROR} - I_{THRESHOLD\,2}$$

The transistors 612, 614, 622, 624, 632, 634, 642, 644 can be sized with any applicable channel lengths and widths as will be apparent to one skilled in the art. In one embodiment, the pair of transistors 612, 614 of the first current mirror 610 and the pair of transistors 632, 634 of the third current mirror 630 each have a channel width ratios of 1:N, wherein N is selected from a range of about 2 to about 5. In another embodiment, the pair of transistors 622, 624 of the second current mirror 620 and the pair of transistors 642, 644 of the fourth current mirror 640 each have a channel width ratios of 1:N, wherein N is selected from a range of about 2 to about 5. Other values of N will be readily determinable by one skilled in the art.

In some embodiments, the first and second threshold generators 650, 652 correspond to constant current sources. In another embodiment, the first and second threshold generators 650, 652 correspond to a controlled current source, such as a voltage controlled current source or a current controlled current source. One specific embodiment is described in connection with FIG. 10.

Figure 7:
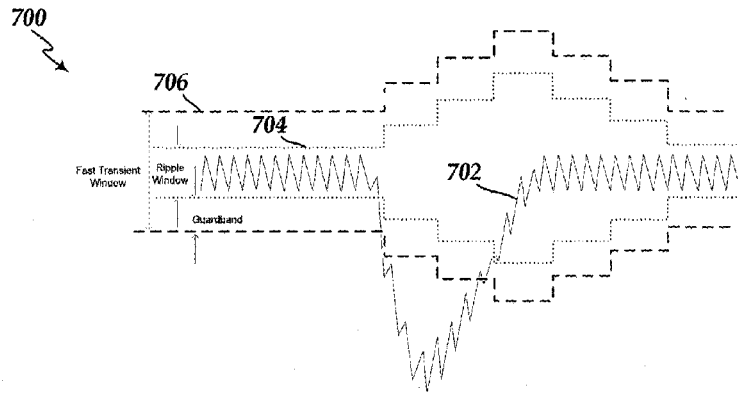
FIGS. 7 and 8 are plots illustrating ripple characteristics of one embodiment of the closed-loop switching regulator of FIG. 1.

Due to the switching nature of the power stage 102 (FIGS. 1 and 2), the output voltage $V_O$ can have a time-varying voltage ripple. The ripple of the output voltage $V_O$ can manifest itself as a ripple in the error signal $I_{ERROR}$. Accordingly, the selection of the threshold $I_{THRESHOLD}$ can depend on the amount of ripple present in the output voltage $V_O$. To illustrate, FIG. 7 is a plot illustrating ripple characteristics 700 of one embodiment of the closed-loop switching regulator 100 of FIG. 1. Time is expressed along a horizontal axis. Voltage is expressed along a vertical axis. The plot includes a first curve 702 that represents the error signal $I_{ERROR}$ during steady state and during a transient. To avoid activating the transient-activated compensator 114 during steady state, the threshold $I_{THRESHOLD}$ should be set above a ripple level. However, increasing the threshold $I_{THRESHOLD}$ can increase the time that it takes for the transient-activated compensator 114 to activate, which will slow down the response to a transient event. The magnitude of the ripple may vary based on a variety of factors, such as the capacitance of the output capacitor $C_O$, the inductance of output inductance $L_O$, an equivalent series resistance of the power stage 102, a switching frequency, a feedback gain of the feedback compensator 106, a duty cycle, and the like. The second set of curves 704 represents a model of a "ripple window" that may be generated dynamically during run-time by processing the error signal $I_{ERROR}$ (or a copy thereof, such as $I_{EM}$). The third set of curves 706 represents a model of a dynamic threshold $I_{THRESHOLD}$ that can be generated based on the ripple window measurements (for example, curves 704) represented by second set of curves 704 and by adding a guardband, such as a DC offset. The guardband can provide extra margin against unintended activation of the transient-activated compensator 114, for example, due to varying magnitudes of the ripple. Generation of the dynamic threshold $I_{THRESHOLD}$ will be described in greater detail later in connection with FIGS. 9 and 10.

Figure 8:
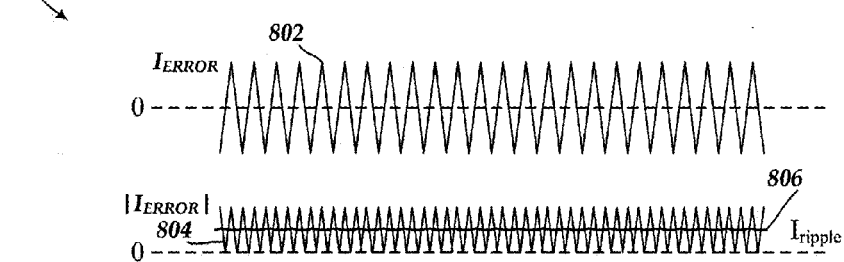

In some situations, it can be difficult to select a fixed predetermined threshold $I_{THRESHOLD}$ suitable for a wide-variety of varying conditions without being overly large. Therefore, it can be desirable to adjust the threshold $I_{THRESHOLD}$ dynamically during operation. To illustrate various aspects of generating the threshold $I_{THRESHOLD}$ dynamically, FIG. 8 shows plots illustrating ripple characteristics 800 of one embodiment of the closed-loop switching regulator 100 of FIG. 1. Time is expressed along a horizontal axis. Voltage is expressed along a vertical axis. The first curve 802 represents a zoomed-in period of the error signal $I_{ERROR}$ during steady state. The plot illustrates the manifestation of output voltage $V_O$ ripple in the error signal $I_{ERROR}$. Second and third curves 804, 806 represent processed versions of the error signal $I_{ERROR}$. The second curve 804 represents the magnitude of the error signal $I_{ERROR}$. The third curve 806 represents a low pass filtered version ("$I_{ripple}$") of the magnitude of the error signal $I_{ERROR}$. The low pass filtered version of the magnitude of the error signal $I_{ERROR}$ provides an indication the size of the ripple window shown in FIG. 7. The low pass filtered version can be generated dynamically with signal processing techniques as described below in connection with FIGS. 9 and 10.

Figure 9:
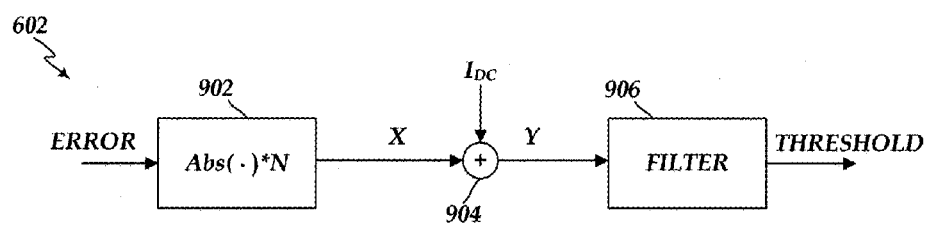
FIG. 9 is a schematic block diagram of one embodiment of a threshold generator of FIG. 6A.

FIG. 9 is the schematic block diagram of one embodiment of a threshold generator 602 of FIG. 6A. The description herein can also apply to the threshold generators 650, 652 of FIG. 6B. The threshold generator 602 includes a first block 902, a summing junction 904, and a filter 906. The first block 902 receives an error signal ERROR (for example, the error signal $I_{ERROR}$ or a copy $I_{EM}$ thereof) as an input and generates a signal X representing an amplification of the magnitude of the error signal ERROR as an output (for example, N|ERROR|). Applicable hardware or software implementations will be readily determined by one of ordinary skill in the art, including, but not limited to, amplifier circuits configured to provide an absolute-value output.

The summing junction 904 receives an offset DC and the signal X as inputs and generates a sum Y of the signal X and the offset DC as an output. For example, the summing junction 904 can correspond to a summing amplifier or a voltage adder that additively combines the offset DC and the signal X. If the sum Y is represented by a current signal, then the summing junction can be a node of a circuit that receives the corresponding currents (for example, $I_{DC}$, $I_X$). Other applicable types of summing junctions, including analog and digital adders, will be readily determined by one of ordinary skill in the art.

The filter 906 receives the sum Y as an input and generates a signal THRESHOLD (for example, $I_{THRESHOLD}$ of FIG. 6A). In the illustrated embodiment, the filter 906 receives the sum Y from the summing junction 904 and generates the signal THRESHOLD by low-pass filtering the sum Y. In some embodiments, the filter 906 is an analog or digital low pass filter circuit. The filter 906 can also be active (for example, using an operational amplifier to generate the ripple signal) or passive (for example, a resistor-capacitor network).

Figure 10:
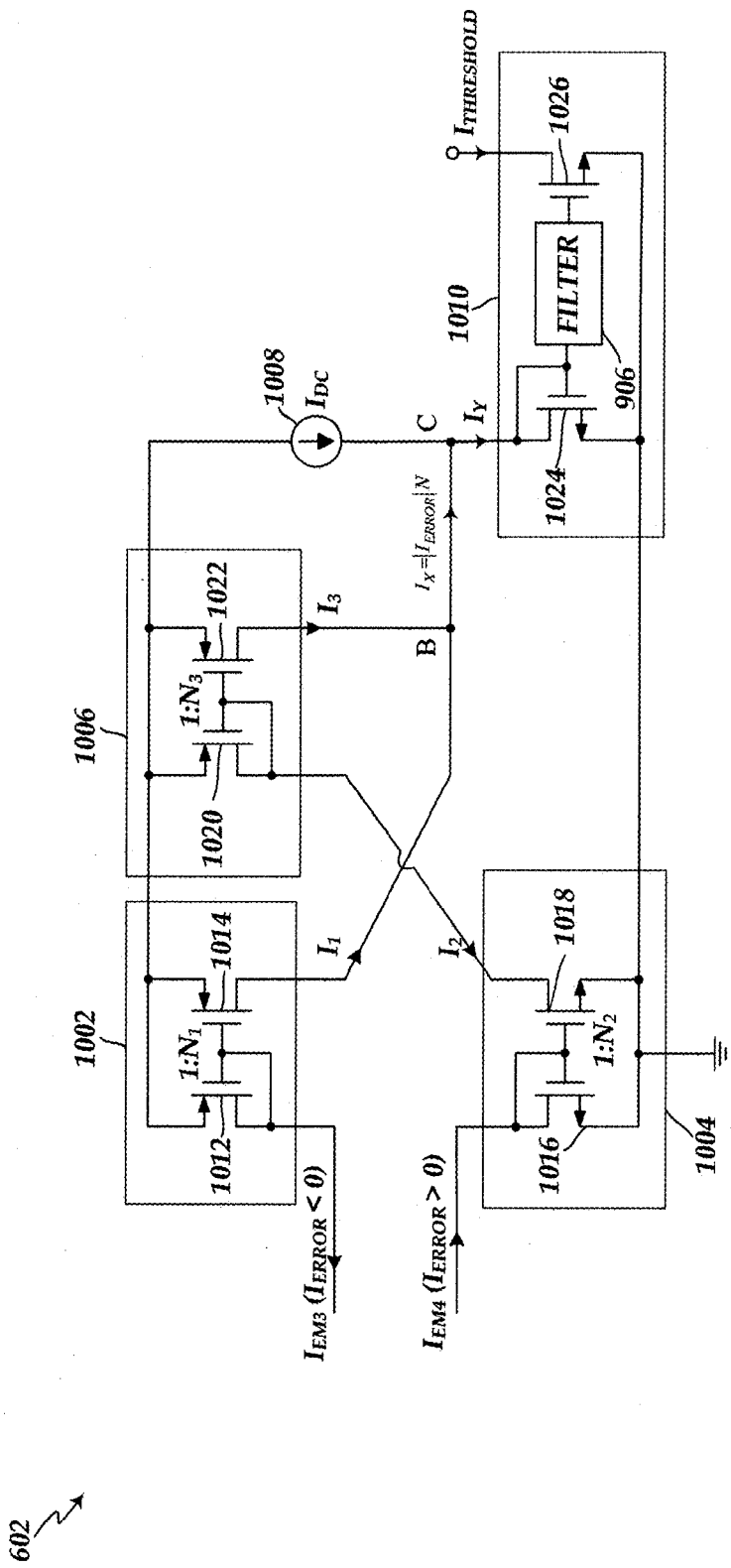
FIG. 10 is a schematic circuit diagram of an embodiment of the threshold generator of FIG. 6A.

FIG. 10 is a schematic circuit diagram of an embodiment of the threshold generator 602 of FIG. 6A. The description herein can also apply to the threshold generators 650, 652 of FIG. 6B.

The threshold generator 602 of FIG. 10 includes a first current mirror 1002, a second current mirror 1004, a third current mirror 1006, an offset generator 1008, and an averaging current mirror 1010. The first current mirror 1002 includes a first transistor 1012 and a second transistor 1014. The second current mirror 1004 includes a third transistor 1016 and a fourth transistor 1018. The third current mirror 1006 includes a fifth transistor 1020 and a sixth transistor 1022. The averaging current mirror 1010 includes the filter 906 as well as a seventh transistor 1024 and an eighth transistor 1026.

In the illustrated embodiment, the threshold generator 602 receives error signals $I_{EM3}$, $I_{EM4}$ as inputs and generates the threshold $I_{THRESHOLD}$ as an output. As described previously in connection with FIG. 4A, the error amplifier 402 of the voltage compensator 112 can generate one or more copies of the error signal $I_{ERROR}$, collectively represented by the error signal $I_{EM}$ in FIG. 4A. In the illustrated embodiment of FIG. 10, the error signal $I_{EM3}$ has a negative polarity or direction, and the second error signal $I_{EM4}$ has a positive polarity or direction. For example, the first error signal $I_{EM3}$ flows out of the threshold generator 602 when the error signal $I_{ERROR}$ of FIG. 4A has a negative polarity or direction, and otherwise has no current. Additionally, the error signal $I_{EM4}$ flows into the threshold generator 602 when the error signal $I_{ERROR}$ of FIG. 4A has a positive polarity, and otherwise has no current.

When the error signal $I_{EM3}$ has a current, the first current mirror 1002 receives the error signal $I_{EM3}$ with the first transistor 1012 and generates a current $I_1$ representing a copy of $I_{EM3}$ with the second transistor 1014. The current $I_1$ can be generated with a gain of $N_1$, by selecting a channel width ratio $1:N_1$ of the first transistor 1012 to the second transistor 1014. For example, the gain $N_1$ can be chosen to be about 3. In another embodiment, the gain $N_1$ can be selected from the range of about 2 to about 5. In yet another embodiment, the gain $N_1$ can be selected to be greater than about 2. Other applicable values will be readily determined by one of ordinary skill in the art. In the illustrated embodiment, the current $I_1$ is provided to a Node B with a direction pointing into Node B.

When the error signal $I_{EM4}$ has a current, the second current mirror 1004 receives the error signal $I_{EM4}$ with the third transistor 1016 and generates a current $I_2$ representing a copy of $I_{EM4}$ with the fourth transistor 1018. The current $I_2$ can be generated with a gain of $N_2$ by selecting a channel width ratio $1:N_2$ of the third transistor 1012 to the fourth transistor 1014. In a particular embodiment, the channel width ratio $1:N_2$ is selected to be 1:1. Other applicable values will be readily determined by one of ordinary skill in the art. In the illustrated embodiment, the current $I_2$ is provided to the third current mirror 1006.

The third current mirror 1006 receives the current $I_2$ with the fifth transistor 1020 and generates a current $I_3$ representing a copy of $I_{EM4}$ with the sixth transistor 1022. The current $I_3$ can be generated with a gain of $N_3$ by selecting a channel width ratio $1:N_3$ of the fifth transistor 1020 to the sixth transistor 1022. In one embodiment, the gain $N_3$ can be chosen to be about 3. In another embodiment, the gain $N_3$ can be selected from the range of about 2 to about 5. In yet another embodiment, the gain $N_3$ can be greater than about 2. Other applicable values will be readily determined by one of ordinary skill in the art. In the illustrated embodiment, the current $I_3$ is provided to the Node B with a direction pointing into Node B.

As described, the Node B receives a current from at least either the first current mirror 1002 or the third current mirror 1006, with a direction pointing into the Node B. If the gains $N_1$ and $N_3$ have a value of N, and the gain $N_2$ has a value of about 1, then a current $I_X$ that flows from the Node B to a Node C can be approximated as:

$$I_X \approx N \cdot |I_{ERROR}| \qquad \text{Eq. 4}$$

The offset generator 1008 also provides a current $I_{DC}$ into the Node C. The currents $I_X$ and $I_{DC}$ combine and form the current $I_Y$, which forms the sum of the current $I_X$ and the offset $I_{DC}$. The offset generator 1008 can be any type of current source or current supply readily determinable by one skilled in the art. A current of the offset $I_{DC}$ can be selected to be about 0.5% to about 2% of the product of the reference voltage $V_{REF}$ and the transconductance $g_m$ of the error amplifier 402. Other applicable currents will be readily determinable by one skilled in the art The averaging current mirror 1010 receives the current $I_Y$ as input and generates the threshold $I_{THRESHOLD}$ as an output. The seventh transistor 1024 (diode connected) carries the current $I_Y$ across its drain and source, generating a voltage at the gate and drain of the seventh transistor 1024. As a result, a voltage is generated at the input of the filter 906. The filter 906 generates a filtered copy of the gate voltage at the gate of the eighth transistor 1026. In doing so, the eighth transistor 1026 generates the threshold $I_{THRESHOLD}$. The threshold $I_{THRESHOLD}$ can be provided to the transient detector 116 of the transient-activated compensator 114. The current $I_{2THRESHOLD}$ can be generated with a gain of $N_4$, by selecting a channel width ratio $1:N_4$ of the seventh transistor 1024 to the eighth transistor 1026. In a particular embodiment, the channel width ratio $1:N_4$ is selected to be 1:1. Other applicable values will be readily determinable by one of ordinary skill in the art.

One advantage, among others, of the various embodiments is that current-mode compensation can be utilized. As a result, the offset associated with voltage-mode error amplifiers may be avoided. Furthermore, in various current-mode embodiments, as discussed above, the absence of the offset of the error amplifier can reduce the complexity of the circuit and its operation.

Another advantage, among others, of various embodiments relates to transient compensation signals that are continuous in the error signal $I_{ERROR}$. For example, as shown in FIG. 5, the transient-activated compensator can provide compensation signal that is continuous error signal $I_{ERROR}$, rather than a discontinuous control action. Furthermore, the transient compensation signal $V_{TC}$ supplements the voltage compensation signal $V_{VC}$ and current compensation signal $V_{IC}$, rather than overrides the existing compensation signal. One result, among others, of the above-discussed aspects is that the magnitude of the control response may appropriate for the magnitude of the transient event.

Figure 11A:
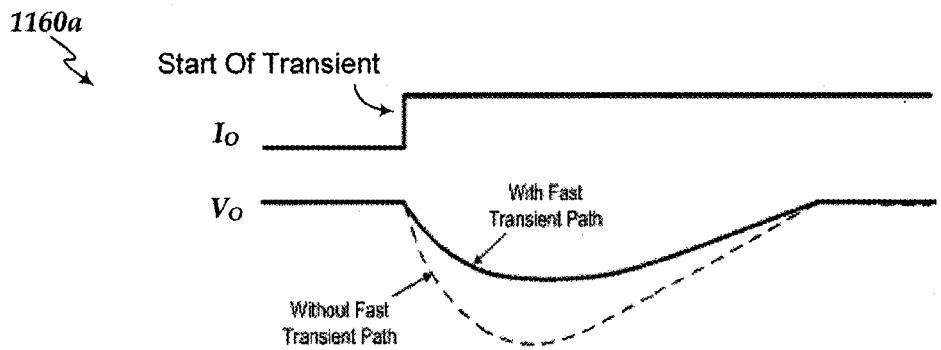
FIGS. 11A-11C are plots illustrating simulation results of one embodiment of the closed-loop switching regulator during a transient condition.
Figure 11B:
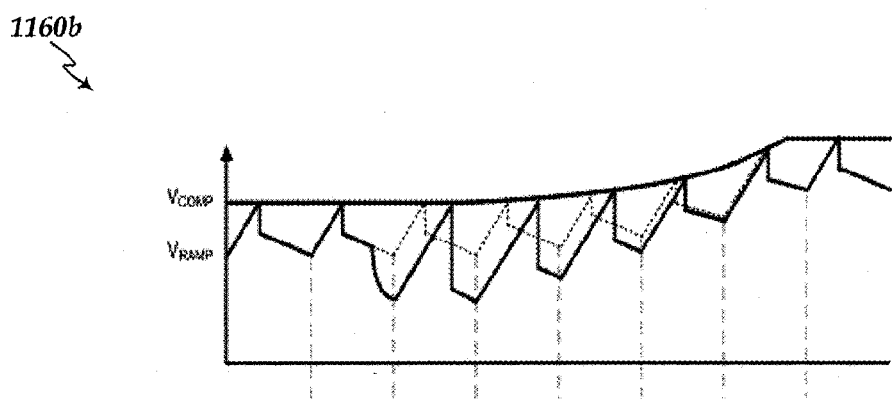
Figure 11C:
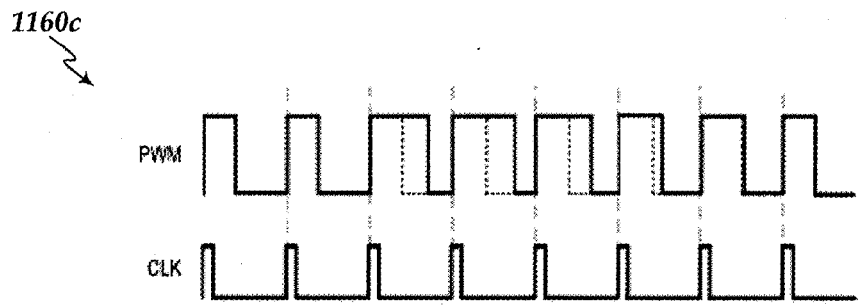

FIGS. 11A-11C are plots illustrating simulation results of one embodiment of the closed-loop switching regulator 100 during a transient condition. The simulation results were generated with the closed-loop switching regulator 100 in accordance with the driver interface circuit 202a of FIG. 3A and the voltage feedback path 108 of FIG. 4A. Additionally, results were generated with the closed-loop switching regulator 100 without transient compensation in the presence of the load disturbance.

FIG. 11A is a plot 1160a illustrating the output current $I_O$ and output voltage $V_O$ of the power stage 102 versus time in the presence of a step load disturbance (for example, a step change in the output current $I_O$). Time is expressed along a horizontal axis. Voltage and current are expressed along a vertical axis. FIG. 11A shows that the transient compensation yielded improved transient response, for example, in terms of reduced settling time and undershoot of the output voltage $V_O$.

FIG. 11B is a plot 1160b illustrating the ramp signal $V_{RAMP}$ and comp signal $V_{COMP}$ generated by the simulations of the FIG. 11A. Time is expressed along a horizontal axis. Voltage is expressed along a vertical axis. In comparison with the closed-loop switching regulator 100 without transient compensation, the closed-loop switching regulator 100 with transient compensation generated the ramp signal $V_{RAMP}$ with reduced magnitude. As noted, the transient compensation signal $V_{TC}$ adds a negative component to the ramp signal $V_{RAMP}$.

FIG. 11C is a plot 1160c illustrating the PWM signals (FIG. 2) generated by the simulations of FIG. 11A. Time is expressed along a horizontal axis. Voltage is expressed along a vertical axis. In comparison to the closed-loop switching regulator 100 without transient compensation control, the closed-loop switching regulator 100 with transient compensation increased the duty cycle of the PWM signal by virtue of the reduced magnitudes of the ramp signal $V_{RAMP}$. As a result, the time in which the high-side transistor 210 remained open increased, generating additional voltage of the output voltage $V_O$.

The various transistors of the foregoing description can correspond to insulated gate field-effect transistors, such as MOSFETs. However, it will be understood that a gate can be made from materials other than metals, such as polysilicon, and an insulation layer can be made out of materials other than silicon oxide, such as a high k dielectric. It will also be understood that the transistors can have various structural types other than MOSFETs, including, but not limited to, BJT, JFET, IGFET, MESFET, pHEMT, HBT, and the like transistor structural types. Further, the various transistors can also have various polarities, such as N-channel, P-channel, NPN-type, and PNP-type; and can include various semiconductor materials, such as GaAs, SiGe, and the like.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

Applications

Devices employing the above described schemes can be implemented into various electronic devices. Examples of the electronic devices can include, but are not limited to, consumer electronic products, parts of the consumer electronic products, electronic test equipment, medical electronic products, etc. Examples of the electronic devices can also include memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional. peripheral device, a wrist watch, a clock, etc. The medical electronic products can include, but are not limited to, a Digital-X-ray detector, a CT (Computed Tomography) scanner, an Ultrasounds system, a MRI (Magnetic Resonance Imaging) system, etc. Further, the electronic device can include unfinished products.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. An apparatus comprising:
a first circuit configured to receive an oscillating reference signal, a first compensation signal, a second compensation signal, and a third compensation signal, wherein the first circuit is configured to generate a comparison signal having a waveform comprising a plurality of pulses having pulse durations based at least partly on a combination of the periodic reference signal, the first compensation signal, the second compensation signal, and the third compensation signal, wherein the first compensation signal is indicative of an error between an output voltage of a power converter and a reference voltage, wherein the second compensation signal is indicative of the error relative to a threshold, and wherein the third compensation signal is indicative of an output current of the power converter; and
a second circuit configured to receive a clock signal and the comparison signal, wherein the second circuit is configured to generate a drive signal for activation and deactivation of a driver transistor, wherein the second circuit is configured to generate the drive signal such that the drive signal activates the driver transistor based at least partly a characteristic of the clock signal, and wherein the second circuit is configured to generate the drive signal such that the drive signal deactivates the driver transistor based at least partly a characteristic of the comparison signal.

2. The apparatus of claim 1, wherein the first circuit comprises a comparator circuit configured to receive the oscillating reference signal, the first compensation signal, the second compensation signal, and the third compensation signal for generation of the comparison signal, and wherein the second circuit comprises a latch circuit configured to receive the comparison signal for generation of the drive signal.

3. The apparatus of claim 1, further comprising a feedback compensator circuit configured to receive an output voltage for generation of the first and second compensation signals for regulation of the output voltage, wherein the feedback compensator circuit is configured to generate an error signal based at least partly on comparing the output voltage with the voltage reference signal, wherein the feedback compensator circuit is configured to generate of the first compensation signal based at least partly on the error signal, and wherein the feedback compensator circuit is configured to generate the second compensation signal if the error signal exceeds a threshold.

4. The apparatus of claim 3, wherein the error signal is a current signal and the first and second compensation signals are voltage signals.

5. The apparatus of claim 3, wherein the feedback compensator circuit comprises a voltage compensator configured to generate the first compensation signal based at least partly on the error signal, a transient detector circuit configured to generate a transient detection signal if the error signal exceeds the threshold, and a transient compensator configured to generate the second compensations signal upon activation by the transient detection signal.

6. The apparatus of claim 5, wherein the transient compensator is configured to deactivate upon an absence of the transient detection signal.

7. The apparatus of claim 5, wherein the transient compensator is configured to have a higher bandwidth than the voltage compensator.

8. The apparatus of claim 5, wherein the transient compensator is configured to generate the second compensation signal such that the second compensation signal varies continuously with the error signal.

9. The apparatus of claim 5, wherein the transient compensator is configured to generate the second compensation signal such that the second compensation signal increases linearly with the error signal for a range of values of the error signal greater than the threshold.

10. The apparatus of claim 5, wherein the transient detection circuit is configured to generate the transient detection signal independent of the first compensation signal.

11. The apparatus of claim 5, wherein the transient detector and the transient compensator form a transient-activated compensator circuit comprising:
a controlled current source configured to generate a transient current signal having a current based at least partly on an amount the error signal is greater than the threshold; and
a compensation network configured to receive the transient current signal and configured to generate the second compensation signal by providing the transient current signal to the compensation network to generate a voltage signal of the second compensation signal.

12. The apparatus of claim 11, wherein the controlled current source comprises:
 a diverting current source configured to supply a diverting current;
 a current mirror operatively coupled to the diverting current source such that a circuit formed by the current mirror and the diverting current source is configured to receive the error signal, wherein the diverting current source is configured to divert a portion of the error signal away from the current mirror by supplying the diverting current, wherein the current mirror is configured to generate a copy of an undiverted portion of the error signal; and
 an output node configured to supply the transient current signal based on the copy of the undiverted portion of the error signal.

13. The apparatus of claim 3, further comprising a threshold adjustment circuit configured to adjust the threshold over time based at least partly on a characteristic of the error signal.

14. The apparatus of claim 13, wherein the threshold adjustment circuit is configured to filter a magnitude of the error signal and add an offset for adjustment of the threshold.

15. A method for generating a drive signal, the method comprising:
 receiving an oscillating reference signal, a first compensation signal, a second compensation signal, and a third compensation signal, wherein the first compensation signal is indicative of an error between an output voltage of a power converter and a reference voltage, wherein the second compensation signal is indicative of the error relative to a threshold, and wherein the third compensation signal is indicative of an output current of the power converter;
 generating a comparison signal having a waveform comprising a plurality of pulses having pulse durations based at least partly on a combination of the periodic reference signal, the first compensation signal, the second compensation signal, and the third compensation signal; and
 generating the drive signal for activation and deactivation of a driver transistor, wherein the drive signal is generated such that the drive signal activates the driver transistor based at least partly a characteristic of the clock signal, and wherein the drive signal is generated such that the drive signal deactivates the driver transistor based at least partly a characteristic of the comparison signal.

16. The method of claim 15, further comprising:
 determining whether the error between the output voltage of the power converter and the reference voltage exceeds a threshold; and
 in response to the error exceeding the threshold, generating the second compensation signal.

17. The method of claim 16, wherein the determining includes monitoring an error signal, wherein the error signal is a current signal indicative of the error between the output voltage of the power converter and the reference voltage, and wherein the first and second compensation signals are voltage signals.

18. The method of claim 16, further comprising adjusting the threshold over time based at least partly on a characteristic of the error signal.

19. The method of claim 18, wherein the adjusting comprises filtering a magnitude of the error signal and adding an offset for adjustment of the threshold.

20. An apparatus comprising:
 means for receiving an oscillating reference signal, a first compensation signal, a second compensation signal, and a third compensation signal and for generating a comparison signal, wherein the first compensation signal is indicative of an error between an output voltage of a power converter and a reference voltage, wherein the second compensation signal is indicative of the error relative to a threshold, wherein the third compensation signal is indicative of an output current of the power converter, wherein the comparison signal has a waveform comprising a plurality of pulses having pulse durations based at least partly on a combination of the periodic reference signal, the first compensation signal, the second compensation signal, and the third compensation signal; and
 means for generating a drive signal for activation and deactivation of a driver transistor, wherein the drive signal is generated such that the drive signal activates the driver transistor based at least partly a characteristic of the clock signal, and wherein the drive signal is generated such that the drive signal deactivates the driver transistor based at least partly a characteristic of the comparison signal.

* * * * *